Nov. 14, 1967     S. E. JORGENSEN ET AL     3,352,211

DIAPHRAGM UNIT

Filed April 27, 1967

# United States Patent Office 3,352,211
Patented Nov. 14, 1967

3,352,211
DIAPHRAGM UNIT
Svend E. Jorgensen and Hans Siegfred, Nordborg, Denmark, assignors to Danfoss A/S, Nordborg, Denmark, a company of Denmark
Filed Apr. 27, 1967, Ser. No. 634,185
5 Claims. (Cl. 92—42)

ABSTRACT OF THE DISCLOSURE

A diaphragm unit formed from a pair of telescoped dished plate elements each having a plate portion and a rim the marginal edge portions of which cooperate to define a cavity or space having a wedge-shaped section in elevation defined by the marginal edge portion of one of the elements bent back over the marginal edge portion of the other element. The wedge-shaped space converges in a direction outwardly of the elements and is filled or sealed with soft solder.

Figure 1:
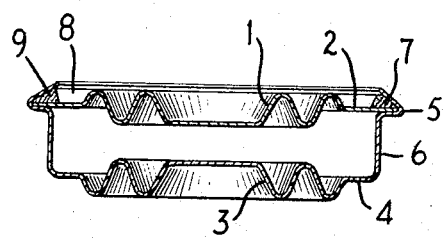

The bent marginal edge portion is bent over the other edge portion in a manner limiting relative lateral movement of the elements and the edge portions overlie each other in a manner in which the seal is subjected essentially only to compressive forces and not shear and tension so that a very tight diaphragm is constructed with a long-lived seal.

---

This is a continuation-in-part of our application Ser. No. 447,767 filed April 13, 1965, and now abandoned.

The invention relates generally to diaphragms and more particularly to a diaphragm unit consisting of two dished, preferably corrugated telescoped plates which are sealed along marginal edge portions of rims thereof.

Known diaphragm units of this kind usually consist of a pair of dished plates with an attached cylindrical rim portion. The rim portions of the two plates usually have slightly different radii, and are telescopically inserted into each other. The annular space defined between the cylindrical portions is then filled with solder to seal the element hermetically. Unfortunately, however, in the course of time, this seal does not remain airtight.

Movement of the diaphragm plates in relation to each other results in a corresponding movement of the rim edge portions by which they are soldered together. In the known diaphragm elements this movement leads to an alternating, or dynamic strain on the soldered seam or seal and consequently to failure thereof.

It is a principal object of the present invention to provide a two-piece diaphragm unit having a tight seal which will not leak in use or under varying, or dynamic loading.

Briefly, according to the invention, the diaphragm unit is formed by a pair of dished plate elements having rims parallel to a common diaphragm plane. One rim is provided with an annular extension or marginal rim edge portion which is bent reversely over the edge of the other rim. A space is formed between the annular extension and the other rim substantially conical in vertical section and is filled with solder.

In the device according to the invention the solder seam or seal is located at a region where, upon movement of the diaphragm plates relative to each other, the seam is subject only to compression. Moreover, the solder seal space is of decreasing vertical cross-section and is filled with soft solder, which facilitates the filling operation of the seal space with solder and improves the eventual tightness of the seal.

The diaphragm plates are preferably formed such that in their rest position the two rims are disposed lying flat on one another. A partial vacuum within the diaphragm unit does not influence the solder seam or seal since the edge of one of the rims of the plate elements is supported on the bent rim of the other plate element.

The present invention enables the use of a tin base solder although in the known diaphragm units the tendency has been towards using a silver solder, in spite of the necessity of a higher soldering temperature.

Figure 2:
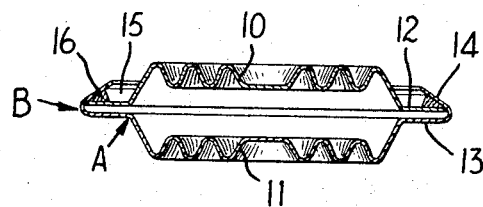

The structure, organization, and operation of the invention will now be described more specifically in the following detail description with reference to the accompanying drawings, in which:

FIG. 1 is a side elevation section view through an embodiment of a diaphragm element according to the invention; and FIG. 2 is a side elevation section view through another embodiment of the diaphragm element according to the invention.

Referring now to FIG. 1, an annular, corrugated, dished diaphragm plate 1 is provided with a laterally projecting rim 2 lying in a given plane of the plate 1. Another, likewise corrugated, annular, dished diaphragm plate 3 is formed with one edge portion 4, lying at the diaphragm level, and parallel, but offset to another edge portion or rim 5. The two edge portions or rims 4, 5 are connected with one another over a cylindrical portion 6 provided to increase the volume of the unit. The rim 5 is provided with an annular extension or marginal rim edge portion 7 which is bent backwards or reversely over the edge of the rim 2. A channel or wedge-shaped space 8 with a reducing or substantially conical vertical section is formed between the lower rim 2 and the annular extension 7. This space is filled with an annular tin base solder seal or filling 9.

FIG. 2 illustrates a diaphragm unit consisting of two similar annular diaphragm plates 10 and 11 both formed with edge portions or rims 12, 13 lying parallel to the diaphragm level and parallel to a common plane intermediate the plate elements. The two parts are similar to each other with the only exception that the lower diaphragm plate 11 rim is provided with an annular extension or marginal rim edge portion which is bent reversely over the edge of the rim 12. A channel or wedge-shaped space 15, which is filled with a tin base solder 16, is formed between the annular extension 14 and the rim 12. The space 15 reduces in vertical section similarly to the tapered space 8 and converges outwardly in the same way. If diaphragm plates 10 and 11 move away from each other, the rims will tilt towards each other and subject the seam only to compression. When the plates move towards each other, the inner edges bear against and support each other at both the points A and B, and again there will be no strain tending to pull the seam apart.

The diaphragm plates may be smooth, or not corrugated; their form will depend on the design requirements. The material generally used is a metal. For elements of a particularly small height it is possible to arrange the corrugations of the two dished plates such that the top and bottom corrugations fit into each other when the plates are in a resting position.

The annular wedge-shaped spaces in which the solder fillings are disposed are readily filled with solder. It has been found that the marginal rim edge portions within which the solder is disposed should define therebetween an acute angle in the range 15° to 60°. An angle which has been found very satisfactory in this range of possible angles is an angle of 45°.

Those skilled in the art will understand that the reverse bending of one rim over the other in the manner of the invention avoids the necessity of heating the rim that is reversely bent over the other. The usual construction of these units has the reversely bent rim overlying the other substantially parallel thereto. In order to avoid fracture or undue strain of the metal in the known devices the rim being bent must be heated. Moreover, the fact the wedge-shaped space opens inwardly, as shown, a considerable amount the annular solder spaces are readily filled with solder. The solder spaces, of course, are closed in the outward direction where the tip or apex of the acute angle desired, within the range 15° to 60°, is formed.

While preferred embodiments of the invention have been shown and described it will be understood that many modifications and changes can be made within the true spirit and scope of the invention.

What we claim and desire to be secured by Letters Patent is:

1. A diaphragm unit comprising, a pair of telescoped dished plate elements disposed opposed to each other, each plate having a rim generally parallel to a common plane intermediate said plate elements, the rim portions being disposed juxtapositioned in registry bearing on one another, one of said plates having a marginal rim edge portion bent reversely over a marginal rim edge portion of the other plate and extending inwardly defining an annular wedge-shaped space converging in a direction outwardly, the bent rim edge portion defining an angle with the other marginal rim portion it overlies having a value in a range of about 15° to about 60°, and a solder filling in said wedge-shaped space securing said marginal edge portions defining an annular seal therebetween.

2. A diaphragm unit according to claim 1, in which said angle is about 45 degrees.

3. A diaphrgam unit according to claim 1, in which said rims are flat and bear against each other.

4. A diaphragm unit according to claim 1, in which said bent marginal rim edge portion bears against the rim of the other marginal rim edge portion and substantially precludes relative radial movement therebetween.

5. A diaphragm unit according to claim 1, in which said solder filling comprises a tin base solder.

References Cited

UNITED STATES PATENTS

| | | | |
|---|---|---|---|
| 1,045,791 | 11/1912 | Hodge | 92—45 X |
| 1,109,705 | 9/1914 | Serrell et al. | 92—45 X |
| 1,150,606 | 8/1915 | Kinealy | 92—104 |
| 1,816,610 | 7/1931 | Persons | 29—454 |
| 2,071,583 | 2/1937 | Schutt | 92—45 X |
| 2,123,381 | 7/1938 | Reichel | 29—454 |
| 2,323,985 | 7/1943 | Fausek et al. | 92—42 |
| 2,756,777 | 7/1956 | Bourns et al. | 92—45 |

MARTIN P. SCHWADRON, *Primary Examiner.*

I. C. COHEN, *Assistant Examiner.*